United States Patent [19]

Ehrreich

[11] Patent Number: 4,786,437

[45] Date of Patent: Nov. 22, 1988

[54] ONE-COMPONENT, PARTICLE-FILLED COMPOSITIONS

[75] Inventor: John E. Ehrreich, Acton, Mass.

[73] Assignee: Ercon, Inc., Waltham, Mass.

[21] Appl. No.: 49,111

[22] Filed: May 13, 1987

Related U.S. Application Data

[62] Division of Ser. No. 716,583, Mar. 27, 1985, Pat. No. 4,683,082.

[51] Int. Cl.[4] .......................... A01B 1/04; A01B 1/06

[52] U.S. Cl. .................................. 252/506; 252/502; 252/511; 252/512; 252/513; 252/514; 252/518; 252/519; 524/178; 524/179; 524/180; 524/182; 524/431; 524/439; 524/440; 523/457; 523/458; 523/459; 523/468

[58] Field of Search ............... 252/514, 512, 518, 513, 252/519, 502, 506, 511; 428/403, 407, 408; 427/216, 217, 220; 524/178–180, 182, 431, 439, 440; 523/457–459, 468

[56] References Cited

U.S. PATENT DOCUMENTS 4,683,082 7/1987 Ehrreich .............................. 252/512

4,689,250 8/1987 Quella et al. ........................ 252/512

*Primary Examiner*—Josephine Barr

*Attorney, Agent, or Firm*—Andrew F. Kehoe

[57] ABSTRACT

Unfavorable interaction is prevented between (a) electroconductive particle fillers and (b) organic resin binders of the type which are normally instable with respect to viscosity when aged in contact with said fillers. Moreover, electroconductivity degradation is also avoided. In a preferred mode of the invention, the particle surface is treated with a coating of an interfacial pacifying agent such as a tetravalent tin compound which both enhances the electroconductive performance of the particles and also is sufficiently compatible with the resin binder to migrate into the binder sufficiently to avoid undue gelling of the binder by particle-borne contamination or residues of such contamination.

22 Claims, No Drawings

ONE-COMPONENT, PARTICLE-FILLED COMPOSITIONS

RELATED APPLICATION

This invention is a divisional Application of U.S. patent application Ser. No. 716,583 filed on Mar. 27, 1985 now U.S. Pat. No. 4,683,082 by John E. Ehrreich and entitled ONE-COMPONENT, PARTICLE-FILLED COMPOSITIONS.

BACKGROUND OF THE INVENTION

The present invention relates to stable, particle-filled, organic resin systems wherein, were it not for the use of pacifying reactants and procedures disclosed in this invention, particle-borne contamination would (a) destabilize sensitive resin-binder systems and (b) deleteriously effect good ohmic contact between particles of electroconductive fillers which impart electroconductivity to the systems.

The work of earlier investigators includes a number of methods for assuring processability of polymer compositions which include large quantities of fillers such as electroconductive metal particles. One method has been to segregate the metal particle in a first part of an organic resin binder system which is relatively no-reactive with the metal product and combine the various parts of the binder system just before use. Also, the combination may be made when low storage temperature facilities are available to assure the required processability of the combined system. In other circumstances, the manufacturer, or user of such systems used some chemical-washing technique to remove contamination on powders to optimize their performance. While considerable attention has been given to the effect of filler contamination on the stability of organic binder system, it has also been noted that some polymeric binder systems may themselves contain reactive groups which react unfavorably with metal particles, e.g. undesirably contributing to undesirable chemical coating the surfaces with polymer, oxides, and or other chemicals and, thereby, reducing the electroconductive properties of a mass of such particles in coatings or articles using the polymeric binder system. This reaction may be with the metal itself, but often it is the particle-carried contaminants such as lubricants and the like which are found on most commercially-available metal flakes and many other metal powders.

Thus it has remained a problem in the prior art to provide storable, one-component, compositions which are highly-filled with electroconductive particles. It is a particular problem to provide particles which can be used in a broad-range of filled, organic, binder-systems without fear of excessive deterioration of electrical properties of the systems. A companion problem has been deterioration of the polymer system itself caused by the metal powder or metal-borne contaminants. Contamination caused by the metal powder may result in gelling of the composition rendering the composition useless.

The present inventor has addressed himself to these problems.

It is also noted that tetravalent tin compounds including mercaptides have long been used to provide lifetime heat stabilization for polyvinyl chloride polymer systems. See, for example, *Modern Plastics Encyclopedia,* 1981–1982 (McGraw-Hill; New York, N.Y.) Pages 200–202.

It is noted that the above discussion of the prior art is necessarily made with knowledge of the present invention. Applicant specifically denies that all the various factors discussed were in fact related one to the other by those skilled in the art at the time the present invention was made.

SUMMARY OF THE INVENTION

It is a principle object of the invention to provide novel electroconductive particles, including particularly electroconductive metal flakes, which may be utilized with a very broad range of organic resin binder systems to form stable, one-component, systems suitable for formation of electroconductive coatings and the like.

Another object of the invention is to form liquid-processable one-compound compositions which are generally coatable or sprayable or silk-screenable and which, on aging, do not result in either an excessive increase in viscosity of the binder system in its processable state or an excessive increase in the resistivity of the system after the compositions are converted to a solid state.

A particular object of the invention is to provide stable one-component system which utilizes silver flake in binder systems which normally would not form stable, systems with silver flake.

Another object of the invention is to provide very stable, filled electroconductive systems which may be highly controlled with respect to resistivities.

Those skilled in the art, on reading this disclosure, will understand that the inventor has a number of further objects including, but not limited to, stabilizing a large number of particle/binder combinations not specifically mentioned above.

In general, the above objectives have been achieved by incorporating multifunctional agents which affect not only the interface between polymer and particles but also prevents damage to the polymer. These interfacial agents, described herein as pacifiers, particularly organotin compounds, and most advantageously mercaptides and like S-bearing compounds, are put onto the filler particles or into the binder system in quantities effective to assure effective action at the particle-to-binder interface and excellent shelf-life of the organic binder system and excellent electroconductive stability of the particle fillers.

The pacifiers can be incorporated effectively for use in the invention in a number of ways: One important procedure is to incorporate the agent directly onto the surface of the filler particles. This can be done during manufacture. For example, the pacifier agent can be in the form of a lubricant used during the manufacture of a flake filler product. Another way to incorporate the agent is to dissolve it in a solvent, apply the resulting coating solution to the flake surface, and evaporate the solvent vehicle to leave the stabilizer in place. Still another procedure would be follow a first solvent-coating step with a solvent wash for the purpose of removing excess pacifier from the particle surface. Another procedure would be to add the agent to the binder system itself before incorporation of the filler particles into the binder system; although this may be convenient, this method is usually not as efficient as precoating the filler surface. It is advantageous to use liquid pacifiers or solid pacifier dissolved in a minimum amount of a diluent (such as a plasticizer) because, upon evaporating the volatile solvent, the coated particles will not be glued together, making the difficult to disperse in a binder system.

In general, the quantities of pacifier utilized tend to be substantially greater than quantities of such chemicals which have been heretofore used in polyvinyl chloride resin-based compositions. Despite this fact, and the fact that the pacifier is initially immobolized on the particles, this process is a very effective way of simultaneously protecting properties such as electroconductivity and avoiding degradation of the polymer system due to filler-borne contamination. Typically at least 2% of the organotin compound based on the weight of dry organic resin binder is used. Usually 1 to 10% is used.

While Applicant does not wish to be bound by any particular theory, it is believed that the pacifiers are sufficiently concentrated near the particle surfaces that they form means to protect the electroconductive surface itself from adverse interaction with the binder system. They also form means to neutralize the effects, or even remove, surface contamination on the particles. Moreover, the invention interferes with the ability of contaminant residues to enter into deleterious interactions with organic binder components. All of the precise mechanisms by which the electroconductive properties are protected, or even enhanced, are not well understood.

The primary advantage of the invention is believed to be the freedom it allows a compounder to select whatever combination of particle and polymer is appropriate for his particular application without the need to use special storage or component-segregation procedures. However, it is also understood that the invention allows the precise selection of such a property such as electrical conductivity by merely varying the amount of, or choice of, pacifier or by combining a number of different filler particles as may be appropriate.

Among the polymer systems which may be used such polymers as those bearing chlorine atoms susceptible to attack by impurities, and those bearing carboxyl groups, particularly carboxylic acid groups, or groups susceptible to degradation into such carboxyl groups. Among such polymers are polyvinylidene copolymers, acrylic ester-acid copolymers, vinyl copolymers such as that carboxylate-group-bearing copolymer of vinyl chloride and vinyl acetate sold by Union Carbide VMCH. Epoxy systems, such as those comprising acidic adjuvants for rubberizing, or other troublesome adjuvants which tend to interfere with formation of stable, one-component electroconductive systems. Among such materials are curing agents disclosed in U.S. Pat. No. 4,065,625 to Bolger et al.

In short, binder systems may be used which heretofore were insufficiently compatible with most economical electroconductive fillers to allow convenient formulation of filled, one-component application systems. These binder systems are to be considered "aggressive binder systems" in the terminology of this application.

However, such aggressive polymers will often be combined with less chemically-aggressive polymer systems. These less aggressive polymer systems benefit by incorporation of the pacifying agents. Their resistance to degradation during longterm exposure to chemical attack due to the presence of the particles is enhanced. Among such polymers sold by Union Carbide Corp under the trade designation VAGH II, a copolymer of vinyl chloride acetate with hydroxyl groups, the acrylic copolymer sold under the trade name B44 by Rohm & Haas; the epoxy resin systems typified by an amine-cured system base on the epoxy sold by Shell Chemical under the trade designation Epon 828.

Also useful and non-aggressive are specialty polyesters are thermoplastic, linear, high-tensile, aromatic-polyester resins such as those commercial products sold by Goodyear Tire and Rubber Company under the trade designation Vitel. Among the more advantageously-used resins are such grade designations as PE-200, PE-100, PE 200-D, PE-222 and VPE-5066A. All of these listed Vitel materials are said by their supplier to have elongations to break of 10% or less, to have tensile strengths of about 5000 psi or higher. Some have glass transition points of 140° F. or higher. Specialty aromatic polyesters having tensile strengths of 3000, elongation of up to 50%, and glass transition temperatures of 100° F. or higher are preferred in the practice of the invention, particularly in combination with polyvinylidene chloride copolymers systems. The literature reports that typically, such specialty polyester resins now available are polycondensation products of an aromatic dicarboxylic acid such as isophthalic or terephthalic acid with dihydroxy alkane such as ethylene or propylene glycol. However, the precise molecular building blocks are believed to be relatively unimportant except as to the convenience with which the desired physical properties are achieved.

Among useful vinylidene chloride polymers and copolymers, binder polymers which are often troublesome when used without the benefits of this invention, is a relatively easily soluble copolymer such as that sold by Dow Chemical Company under the trade designation SARAN F-310. (This particular material comprises acrylonitrile-derived groups).

The discussion of polymers herein in not intended to be limiting. However, it should be realized that a particular advantage of the invention is to provide fillers so modified that they do not result in the gelling of sensitive polymer systems and, at the same time, maintain essential electroconductive properties. Thus particular attention is to be paid to binder systems which do not exhibit any substantial aging problems in the absence of a filler, e.g. silver flake, but which do gel in the presence of silver flake.

The invention is useful with a wide variety of fillers. Among the metal fillers that are useful are such noble metal particles as gold, silver and platinum; palladium; aluminum, nickel. Also copper and copper-bearing alloys and compounds including bronze-type flakes such as those sold for decorative coatings. Magnetic particles, such as gamma iron oxide, and graphite powders are also beneficially utilized in compositions of the invention.

One advantage of the invention is that it allows choice of a broad range of solvents to meet the needs of various application procedures. Such diverse organic solvents as acetone, isophorone, ethyl alcohol, aromatic like toluene, methylene chloride and other halogenated hydrocarbons are only illustrative of the broad range of organic solvents which may be used as vehicles for the polymer. Moreover, all of the illustrated solvents can be used, as is appropriate, for making pacifier solutions to help apply the pacifier to the surface of the filler particle.

The selection of pacifier may be made for the purpose of protecting the binder system from gelling associated with the powder or its surface contaminants, or for the purpose of overcoming a deterioration of the beneficial properties such as electroconductivity, thermal conductivity, or the like. In general, it is relatively easy to avoid gelling but somewhat more difficult to select the amount of pacifier required to optimize filler performance, e.g. to optimize conductivity. Nevertheless, it is easy to select a highly advantageous system for each of the very many combinations of filler and binder made possible by following the teachings of this disclosure.

Among more advantageous pacifiers are organotin agents. Among these, the easiest to distribute on the filler surface are the liquid-phase agents which can be deposited upon the surface, in very thin films, from solution.

Among useful organotin compounds are alkyl organotins, tin mercaptides, tin carboxylates; and alkyl tin mercapto esters. (Many such compounds are known to the art and have been used widely in life-time heat and light stabilization of poly (vinyl chloride)-based compositions. However, their use as a multifunctional interfacial processing aid as described herein is nowhere suggested in the prior art.) Among specific compounds are stannous octoate, di-octyltin bis, (iso-octylmercapto acetate; a di-n-octoyltin maleate polymer. Other commercial preparations include organotin compounds sold under the trademark Thermolite by M & T Chemicals Inc of Rahway, N.J. (Some such specific Thermolite grade designations include 25, 31 Super, 45, 42, 831 III, 813. Also mercaptoacid esters and mercaptoalcohol esters are also suitable stabilizers. In general, there appears to be an advantage to utilizing either a single compound or an intimately-mixed interfacial compositions which utilizes both the tin stabilization and mercapto-type groups.

ILLUSTRATIVE EXAMPLE OF THE INVENTION

In this application there is described some preferred embodiments of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof, to the extent they are presently understood by the invention and will be able to modify it and embody it in a variety of forms, each as may be best suited to the condition of a particular case.

In general: Unless otherwise noted the aging characteristics of the samples set forth below are determined by aging at 80° C. in a sealed bottle for 15 hours. Thus, a binder can be evaluated for instability (i.e., "chemical aggressiveness" which results in nonstability discussed above) by testing it 15 hours at 80° C. with no filler and 15 hours at 80° C. with a filler which has not been stabilized according to the invention. Conductivity is measured after aging the ink and then silk screening through a 200-mesh screen. The resistivity then measured along a silkscreened and dry, a 2-inch-long, strip of solidified coating composition 0.0005 inch thickness and of 0.04 inch width. Other characteristics of the compositions of the invention which are shown to be excellent include abrasion resistance, creasing resistance and, adhesion as measured by resistance to peel from polyester (Mylar-type) substrates.

EXAMPLE 1

A composition was prepared by thoroughly mixing the following ingredients:

Acetone—20 parts

Thermolite 831 III—0.4 parts

Thermolite 831 III is a pacifier believed to be based on dioctyltin bis (iso-octylmercapto acetate).

Five parts by weight of the resulting mixture were mixed thoroughly with 15 parts by weight of a silver flake powder obtained from Metz Metallurgical Corp under the trade designation Metz No. 7. The flake passes 325 mesh screen and has a tap density (bulk density) of about 3.2 grams per cc. The wettreated silver flake thereafter was warm air dried with periodically mixing during drying until the solvent was evaporated.

11.6 parts per weight of the resultant, treated silver flake filler were mixed with 6.4 parts by weight of polymer binder system comprised of 4 parts of a 20% solution of a polyester sold under the trade designation Vitel PE200 by Goodyear Tire and Rubber Co. in isophorone and 2.4 part of 33 ⅓% solution, of a polyvinylidene-chloride acrylonitrile copolymer sold under the trade designation Saran F310 by Dow Chemical in isophorone.

Silk screening of the resulting silver-flake-filled and liquid-processable ink composition and drying gave conductive patterns that had a resistivity of about 1.5 ohms per 2-inch test segment.

After being aged for 15 hours at 80° C. in a sealed glass bottle, there was no gelling of the binder material; it remained in the form of an easily silk-screenable conductive ink formulation, resistivity after aging was in the range of about four ohms.

When the polymer system is aged without the presence of the silver flake, it retained a workable viscosity. When the polymer system is aged in the presence of the silver flake, but without the use of the tetravalent orgatin pacifier agent as described in Example 1, it gels to a useless mass during the aging procedure.

EXAMPLE 2

About 2% by weight of a dialkyl organotin interfacial agent (Thermolite 42 from M & T) was dissolved in acetone. Five parts by weight of the pacifier agent solution was intimately mixed with 15 grams of the silver flake used in Example 1 and allowed to air dry so that the agent became distributed on the flake surface. Then 11.6 grams of the treated flake was mixed with the same organic resin binder system used in Example 1. No gelling of the binder took place on heat aging. Resistivity was about 20 ohms after aging.

EXAMPLE 3

The same binder system was used as described in Example 2. Into 6.4 grams of the binder was mixed 11.6 grams of a dry flake composition formed by coating 3 parts by weight of Metz No. 7 silver flake with 1 part by weight of a a 2% solution of a butyltin mercapto ester (M & T's Thermolite 31 Super) in acetone, then evaporating the acetone. After aging of the ink, resistivity was about 3.4 ohms. The system retained a readily-silk screenable coating consistency.

EXAMPLE 4

Five grams of a 2% solution of a tetravalent organotin pacifying (M & T's Thermolite 45) in acetone was used to treat 15 grams of Metz No. 7 flake. After the flake was dried, 11.6 grams of the treated flake were mixed into 6.4 grams of the binder of Example 3. After heat aging, there was no appreciable increase in viscosity and after silk screening and drying, the resistivity measurement average about 25 ohms.

EXAMPLE 5

Example 1 was repeated except that denatured alcohol was substituted for acetone. No gel took place on aging. The screening and drying of the heat-aged ink had a resistivity of about 7 ohms. The resistance of the unaged ink when screened and dried, was about 1.3 ohms.

EXAMPLE 6

Example 5 was repeated using toluence as the solvent. Dried strip patterns from unaged ink had a resistivity of about 1.5 ohms. Resistivity increased to 8 ohms when strips were prepared from aged ink. No gel formed during aging.

EXAMPLE 7

Example 5 was repeated using methlylene chloride as the solvent. Dried unaged ink strips had resistivity of about 1.4 It increased it about 5 ohms using heat-aged ink. No gel formed during heat aging.

EXAMPLE 8

Taken together with Example 1, this example shows how resistivity may be controlled using the invention: Example 1 was repeated using one-half as much interfacial agent. Results were similar except the resistivity of the dried aged material was about 22 ohms. When the amount of agent was raised to twice the level utilized in Example 1, no gel formed on aging; however resistivity was about 50 ohms.

EXAMPLE 9

A quantity of 0.24 grams of Thermolite 831 III was mixed into twenty grams of the organic resin binder system used in Example 1 to form a pacifying-agent-bearing resin composition.

11.6 grams of Metz No. 7 silver flake was mixed into 6.4 grams of the pacifier-bearing resin. Resistivity of the resulting ink was about 1.4 ohms. After aging the ink, no gel had formed and the resistivity was about 13 ohms.

EXAMPLE 10

Example 1 was repeated except that the Metz No. 7 silver flake was replaced with Metz 5SB silver flake (which passed 100 mesh), a product believed to have a different residue on its surface as a result of the supplier's manufacturing process. On aging of the ink, the material did not gel and its dried-strip resistivity was only about 8 ohms.

EXAMPLE 11

A solution for use in coating the metal filler was prepared by dissolving 0.8 grams of Thermolite 831 into 40 grams of acetone. Five grams of this material was used to coat 15 grams of Metz Silver Flake 15. The flake was dried according to the procedure of Example 1. 11.6 grams of the treated flake was incorporated into 6.4 grams of the organic resin binder system of Example 1. On aging of the ink, there was no gel and dried-strip resistivity was only about 2.3 ohms.

EXAMPLES 12-14

Example 11 was repeated except for the use of different metals. The following results were achieved.

| Example | Aging Test | Metal Used |
|---|---|---|
| 12 | gel-free; about 5 ohms | Metz 16 |
| 13 | gel-free; about 7 ohms | Metz 7ED |
| 14 | gel-free; about 2 ohms | Metz 19 |

EXAMPLES 15-26

The following electrically conductive powders were also treated. In each case the coating of pacifier agent was formed by using 2% Thermolite 831 in acetone, wetting the powder thoroughly with the solution and evaporating to a dry powder product:

| Example | Pacifier Solution Grams | Electrically Conductive Powder Coated |
|---|---|---|
| 15 | 5 | 15 gms. silver flake Handy & Harman as Silflake 135 |
| 16 | 5 | 15 gms. silver flake Metz as Metz 10E |
| 17 | 10.5 | 15 gms. silver powder Metz as C-200 |
| 18 | 10 | 10 gms. thin silver flake(Pat.4,407,674) |
| 19 | 2 | 6 gms. palladium flake (Metz No. 35) |
| 20 | 2 | 6 gms. gold flake (Metz No. 14) |
| 21 | 5 | 5 gms. aluminum flake (Reynolds Aluminum Co.'s 40-XD) |
| 22 | 5 | 3 gms. graphite (Asbury Graphite Mills' Micro 250) |
| 23 | 5 | 10 gms. nickel flake (MD 756 from ALCAN) |
| 24 | 3 | 10 gms. nickel flake (Cobaloy 830 from Graham Magnetics Inc.) |
| 25 | 5 | 10 gms. copper flake (−150 mesh) |
| 26 | 5 | 10 gms. artificial gold (Richpalegold Litho No. 55 from Atlantic Powdered Metals-Inc.) |

EXAMPLE 27

The following example relates to use of the binder system formed of (1) a carboxylate-group-bearing copolymer of vinyl chloride and vinyl acetate and (2) a prepolymerized polyurethane were co-dissolved together in isophorone: The polyurethane is a polyester urethane sold under the trade designation Estane 5715 by Goodrich Chemicals. The copolymer of vinyl chloride and vinyl acetate with carboxylic acid groups is sold under the trade designation VMCH by Union Carbide. Twenty per cent solutions of each polymer system were mixed together equally and 4 grams of the resultant isophorone solution were mixed with six grams of a pacifier-treated silver flake (Metz No. 7) same as that treated in Example No. 1. After aging, there was no gel; the material was easily silkscreened and resistivity was about 5 ohms.

EXAMPLE 28

Twenty parts of a 20% solution of a hydroxyl-group bearing copolymer of vinyl chloride and vinyl acetate (sold under the trade designation VAGH II by Union Carbide) was prepared and mixed into 10 parts of a 20% solution of polyurethane, as described in Example 27, and 6 parts of a 33.3% solution of the Saran F-310 copolymer.

A quantity of 3.75 parts by weight of the resin mixture was mixed intimately with 6.25 parts by weight of the stabilized silver flake used in Example 27. The resulting conductive ink aged very well, remained easily silk-screened and had no gel. The heat-aged ink produced dried strips with a resistivity of about 13 ohms.

EXAMPLE 29

Example 28 was repeated using only a 25% solution of the Saran F310 copolymer in isophorone as the organic polymer component. 3.75 grams of the this polymer solution were mixed with 6.25 grams of the pacifier-treated silver flake. After heat aging the ink, dried-strip resistivity was about 2.2 ohms. No gellation occured in the heat-aged ink.

EXAMPLE 30

A quantity of 18 grams of a 33 1/3% solution of Rohm & Haas acrylic polymer B-44 in cellosolve acetate was diluted with 2 grams of butyl cellosolve acetate. A quantity of 3.5 grams of this acrylic polymer solution was mixed with 6.5 grams of the same treated and stabilized silver flake used in Example 27. After aging, there was a discernible increase in viscosity, but the material was silk-screenable and, after drying, had a resistivity of about 7.4 ohms.

EXAMPLE 31

This example illustrates use of pacifier treated silver flake in a thermosetting epoxy resin system. The epoxy material used was the system sold by Shell Chemicals under the trade designation EPON 828 with 10% of Ciba's RD-1 diluent, butyl glycidyl ether. A quantity of 2.5 grams of this liquid resin system was mixed with 7.5 grams of a treated silver flake product prepared by treating 15 grams of Silflake 135, from Handy & Harman with 5 grams of a 2% solution of Thermolite 831 III in acetone.

A quantity of 0.35 grams of TETA (triethyltetramine) was added to the silver-epoxy mixture. Then the material was coated on a glass slide in a strip 0.3 inches wide, 2 inches long and 0.004 inches thick. It was cured for 20 minutes at 97° C. Resistivity after curing was 0.1 ohms and about $1.5\times10^{-4}$ ohm-cm. The adhesion to the glass was excellent.

When the above mix was repeated using a 2.5-day room temperature cure, the resistivity was measured at 1.05 ohms and about $1.58\times10^{-3}$ ohm-cm.

It is also to be understood that the following claims are intended to cover all of the generic and specific features of the invention herein described and all statements of the scope of the invention which might be said to fall therebetween.

What is claimed is:

1. A process for making an improved electroconductive coating composition comprising the steps of coating an electroconductive metallic flake filler with a quantity of an organotin pacifier agent effective to provide a storable, one-component compositions and only then mixing said flake with an organic resin binder to form a composition of improved stability.

2. In a processable liquid composition subject to conversion to the solid state on drying or curing, said composition being formed of an organic resin binder system and sufficient particulate filler so that, on such solidification, the filler is in particle-to-particle contact within said binder system, the improvement wherein said a quantity of an organotin pacifying agent effective to impart aging stability to said liquid composition is incorporated into said liquid composition.

3. A processable liquid composition as defined in claim 2 wherein said filler particles are coated with said quantity of said pacifying agent.

4. A processable liquid composition as defined in claim 2 wherein said organotin compound is an organotin sulfur compound.

5. A processable liquid composition as defined in claim 3 wherein said filler is an electrically-conductive filler.

6. A processable liquid composition as defined in claim 3 wherein said filler is a metal filler.

7. A processable liquid composition as defined in claim 3 wherein said filler is a metal flake filler.

8. A processable liquid composition as defined in claim 3 wherein said filler is a non-noble metal flake.

9. A processable liquid composition as defined in claim 3 wherein said filler is a precious-metal flake.

10. A processable liquid composition as defined in claims 2, 3 or 4 wherein said organic resin binder is not viscosity stable when heated at 80° C. for 15 hours in the presence of a silver flake which is not treated with said organotin compound but which is stable when so heated in the absence of said silver flake.

11. A liquid composition consisting essentially of an organic resin binder which is a curable epoxy resin and a silver flake treated with an organotin compound.

12. A liquid composition as defined in claim 10 wherein said organic resin binder is an aggressive resin comprising a polyvinylidene chloride copolymer or another chlorine-bearing polymer.

13. A liquid composition as defined in claim 10 wherein said organic resin binder contains reactive carboxylic groups.

14. A liquid composition as defined in claim 10 wherein said epoxy resin comprises acidic agents to improve flexibility.

15. A liquid composition as defined in claim 11 wherein said epoxy resin system is an amine-cured system.

16. A processable liquid composition as defined in claim 2 wherein said level of organotin compound based on dry organic resin binder is from 1 to 10% by weight.

17. A processable liquid composition as defined in claim 16 wherein said level of organotin compound is at least 2% based on weight of dry organic resin binder.

18. A process for making a processable liquid composition suitable for solidifying into an electrically-conductive solid composition, said process comprising the steps of (1) coating an electrically-conductive filler with an organotin pacifying agent in a quantity effective to stabilize the electrical conductivity of said composition during an aging test at 80° C. for 15 hours and (2) dispersing said filler, in a quantity effective to achieve particle-to-particle contact of said filler when said composition is solidified into an organic resin binder system which is not viscosity stable when heated at 80° C. for 15 hours in the presence of said filler before is coated but which is viscosity stable when so heated in the absence of said filler.

19. A process as defined in claim 1 in which said binder is a chemically-aggressive binder.

20. A process as defined in claim 19 wherein said metallic flake is silver flake.

21. A liquid composition as defined in claims 2, 3, 4, 5 or 9 wherein said metal filler is silver flake.

22. A process as defined in claims 1, 18 or 19 wherein said electrically-conductive filler is silver flake.

* * * * *